United States Patent [19]

White, Jr.

[11] 3,845,918

[45] Nov. 5, 1974

[54] VORTEX DISSIPATOR

[75] Inventor: Richard P. White, Jr., Pittsford, N.Y.

[73] Assignee: Rochester Applied Science Associates, Inc., Rochester, N.Y.

[22] Filed: Dec. 7, 1972

[21] Appl. No.: 313,099

[52] U.S. Cl. ............... 244/41, 244/91, 114/66.5 H, 114/16 F
[51] Int. Cl. ........................................... B64c 5/06
[58] Field of Search ............ 244/41, 42 D, 91, 130, 244/40 R, 40 A; 114/66.5 H, 16 F; 416/236

[56] References Cited
UNITED STATES PATENTS

| | | | |
|---|---|---|---|
| 2,074,201 | 3/1937 | Bechereau | 244/91 |
| 2,576,981 | 12/1951 | Vogt | 244/91 |
| 3,171,495 | 3/1965 | Puckett | 416/236 |
| 3,208,422 | 9/1965 | Schopmeyer | 114/66.5 H |

Primary Examiner—Trygve M. Blix
Assistant Examiner—Sherman D. Basinger
Attorney, Agent, or Firm—Cumpston, Shaw & Stephens

[57] ABSTRACT

A vortex dissipator for the tip of an airfoil or hydrofoil lifting surface is formed as a fixed plate secured to the tip and aligned with the free stream direction. The plate extends forward from the trailing edge of the tip and outward from the suction side of the lifting surface and is configured so that the resultant of the velocity of the free stream flow and the rotational velocity of the vortex produces a stall angle of attack relative to the plate and dissipates much of the strength of the vortex.

10 Claims, 7 Drawing Figures

PATENTED NOV 5 1974 3,845,918

3,845,918

VORTEX DISSIPATOR

THE INVENTIVE IMPROVEMENT

Tip vortexes of airfoil and hydrofoil lifting surfaces are well known and are a function of the lift of the lifting surface that generates them. As the lift forces increase with larger and more powerful craft, the strength of the vortexes also increases and causes many problems. For example, the vortex trailing from one helicopter blade causes vibration, noise, and affects the performance of succeeding blades; vortexes from tips or flaps of an aircraft wing affect the performance of the tail section; vortexes from hydrofoils affect the performance of trailing hydrofoils of the same craft; and vortexes from a large aircraft can upset and even crash smaller aircraft that happen into the wake.

Previous attempts to dissipate tip vortexes have not been very successful, and the invention suggests a different way of dissipating tip vortexes with a simple, effective, and economical device that is automatically responsive to vortex strength and does not impair the performance of the craft. The invention seeks safety and reliable performance by dissipating a substantial portion of the strength of tip vortexes to reduce the problems and hazards of vortexes.

SUMMARY OF THE INVENTION

The inventive vortex dissipator for a three-dimensional lifting surface is a fixed plate secured to the tip and aligned with the free steam flow over the lifting surface. The plate extends forward from the trailing edge of the tip and outward from the suction side of the lifting surface far enough to reach to the maximum rotational velocity region of the vortex formed along the tip at any practical aerodynamic angle of attack. The length of the plate at the tip in the free stream direction is about 0.3 to 0.6 times the chord of the tip in the free stream direction, and the plate is shaped relative to the geometry of the lifting surface so that the resultant of the velocity of the free stream flow and the maximum rotational velocity of the vortex produces —a stall angle of attack relative to the plate and dissipates a substantial portion of the strength of the vortex.

DRAWINGS

Figure 1:
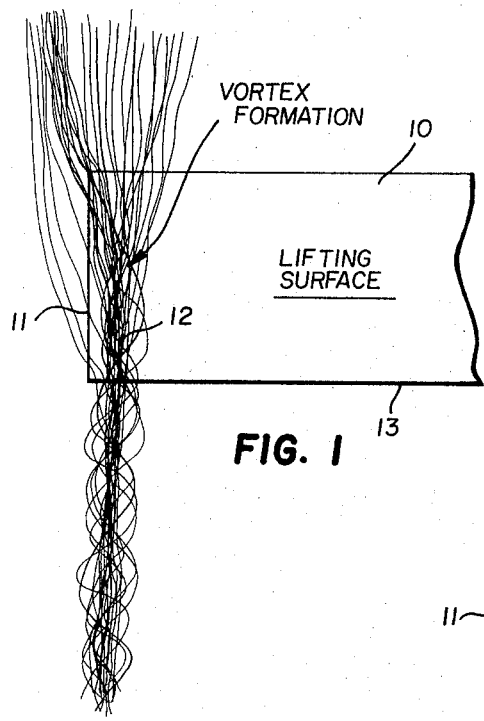
FIG. 1 is a partially schematic, fragmentary plan view of a lifting surface showing vortex formation.

DETAILED DESCRIPTION:

The tip vortexes of three-dimensional lifting surfaces are well known and they occur at the tips of aircraft wings, flaps on aircraft wings, helicopter blades and hydrofoils for both surface craft and submarines. They cause considerable problems in all these circumstances. For example, the vortexes from wing tips and flaps of an aircraft can impair the function of the tail section of the same aircraft, or can upset or crash smaller aircraft flying through the wake of larger aircraft. Many accidents have already been caused by such vortexes. In helicopters, the vortex trails from one blade can interfere with the operation of a succeeding blade such as by causing vibration and noise and impairing blade performance. Vortexes from hydrofoil tips of submarines or surface craft impair the performance of trailing hydrofoils and can cause cavitation, wear and erosion of hydrofoil surfaces, and mishaps from impaired performance.

The circulation strength of the vortex from the tip of a three-dimensional lifting surface has the relationship $\Gamma = L/PV_\infty$ with $\Gamma$ equalling the circulation strength of the vortex, L equalling the lift, $p$ equalling fluid density, and $V_\infty$ equalling free stream velocity. The circulation strength $\Gamma$ is then directly proportional to the lift produced by a lifting surface. The rotational velocity $V_\theta$ of a vortex is also related to the vortex circulation strength $\Gamma$ and the vortex core radius $r$ as shown by $V_\theta = \Gamma/2\pi r$ so that the greater the lift of the lifting surface the stronger the resulting vortex and the faster its rotational velocity. One lifting surface such as an aircraft wing with a flap may generate several vortexes from flag tips and the wing tip, and the strength of those vortexes will be related to the lift distribution along the span of the wing. Several such vortexes from a single craft can combine in the craft's wake to form a vortex stronger than any of the individual vortexes. Since vortexes become stronger as the lift increases, the tendency toward larger and more powerful craft with correspondingly greater lift increases vortex strength and the problems and hazards from vortexes.

The inventive solution to the tip vortex problem is to let the vortex form freely and then use the rotational force of the vortex itself to dissipate a substantial protion of the vortex strength. This is done with a plate secured to the trailing edge of the tip of a lifting surface and aligned with the free stream flow. The plate is shaped relative to the geometry of the lifting surface so that the rotational velocity of the vortex combines with the free stream flow to induce a stall angle of attack on the plate, and this creates sufficient turbulence in the vortex region to break up much of the vortex's circulatory strength and dissipate it. The rotational velocity of the vortex forming along the tip of the lifting surface adjacent the fixed plate has a component moving inward away from the tip, and when this rotational velocity combines with the free stream flow over the tip, the resultant velocity is angled inward to produce an angle of attack on the end plate. The rotational velocity of the vortex is sufficient so that the resultant flow is at or around a stall angle of attack on the fixed plate. The plate at about a stall angle of attack on the resultant flow produces substantial turbulence downstream of the plate, and this turbulence combines with the vortex to dissipate a substantial portion of the vortex strength. Furthermore, this arrangement is automatic or selfadaptive in that the angle of attack of the plate is related to the strength and velocity of the vortex so that when lift increases and the vortex becomes stronger, the angle of attack on the plate also increases to provide greater turbulence having a more powerful effect on the stronger vortex.

Experiments have shown that the turbulence produced by the fixed plate increases the drag by approximately 5 percent, but the plate also increases the lift by about 5 percent so that the lift-to-drag ratio remains substantially unchanged. The plate is preferably confined to the trailing half of the tip and is preferably 0.3 – 0.6 times the chord length of the tip in the free stream direction. This lets the vortex form freely along the leading edge of the tip and generate the strength necessary to induce a stall angle of attack on the plate for creating the turbulence that diminishes the vortex once it is formed. The plate also extends far enough from the lifting surface to reach to the maximum rotational velocity region of the vortex, preferably even at the trailing edge of the plate where the vortex has departed from the lifting surface by a distance related to the angle of attack of the lifting surface. The height of the plate at its trailing edge is preferably at least $$(C/4) \tan \alpha + 0.1C$$

where $c$ equals the chord of the tip in the free stream direction and $\alpha$ equals the maximum practical aerodynamic angle of attack of the lifting surface.

The way to determine the optimum design of the inventive end plate will be apparent to those skilled in the art once they understand the operating principle. The geometry of different lifting surfaces affects the optimum plate geometry, but enough is known of lifting surfaces, tip shape and vortexes to design optimum end plate dissipators for any lifting surfaces having troublesome tip vortexes. Hence, the inventive end plates can readily be applied to most aircraft wing tips, flap tips, helicopter blade tips, hydrofoil tips, submarine vanes, and possibly even propellers.

The tips of lifting surfaces can also be designed for optimum cooperation with the inventive end plate to allow a strong vortex to form and induce the stall turbulence on the plate that dissipates much of the vortex strength. The inventive plate can be applied to both straight and swept wing aircraft wings having various tapers and sweep angles and can be used on the tips of different flaps on aircraft wings. The wing tips might need some changing for optimum combination with dissipator plates, but those skilled in the art will understand how to do this. Similar knowhow is available for applying the invention to the tips of helicopter blades or to the tips of vanes or hydrofoils for submarines or water surface craft.

Figure 2:
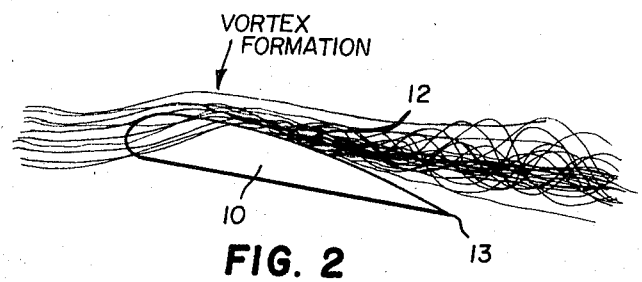
FIG. 2 is a partially schematic, end elevation of the tip of the lifting surface of FIG. 1 showing vortex formation.
Figure 3:
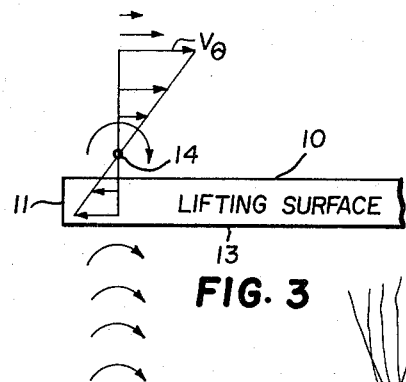
FIG. 3 is a schematic diagram of the rotational velocity of a vortex formed along a lifting surface tip as viewed from aft of the lifting surface.

FIGS. 1 – 3 schematically illustrate some of the known fundamentals of tip vortexes. The airflow schematically represented over the tip 11 of lifting surface 10 of FIG. 1 forms a vortex 12 that spins off aft of trailing edge 13 as illustrated. As shown in FIG. 2, vortex 12 leaves lifting surface 10 about three-quarters of the way aft, and trails off in the general direction of the free stream flow as illustrated. The vortex rotational velocity components in the direction of the span of lifting surface 10 are shown in FIG. 3 where the vortex center 14 is in its normal position above and inward from tip 11. The maximum rotational velocity of vortex 12 has an inward component V above center 14 approximately as illustrated.

Figure 4:
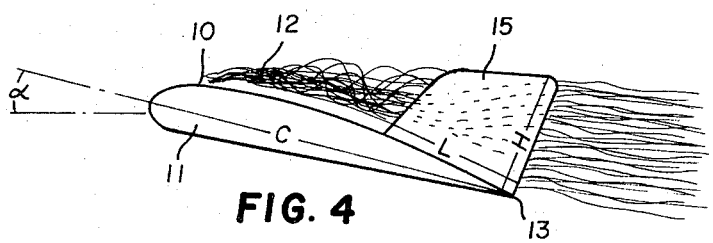
FIG. 4 is an end elevation of a preferred embodiment of the inventive vortex dissipator applied to the tip of a lifting surface.

FIGS. 4 – 7 show the inventive end plate 15 applied to the tip 11 of lifting surface 10 to dissipate the vortex strength. As best shown in FIG. 4, the length L of plate 15 at tip 11 is about 0.3 to 0.6 times the chord C of tip 11 in the direction of the free stream flow, and plate 11 extends forward from trailing edge 13.

This allows vortex 12 to form freely and forcefully along the leading half of tip 11 to induce the desired stall angle of attack on plate 15. Plate 15 extends far enough to reach to the maximum rotational velocity region of vortex 12, and the height H of plate 15 at its trailing edge is preferably related to the maximum practical aerodynamic angle of attack $\alpha$ of lifting surface 10. The angle of attack $\alpha$ is approximately the angle at which vortex 12 departs from lifting surface 10 and this affects the distance of vortex 12 away from lifting surface 10 at the trailing edge of plate 15. The preferred relationship is $$H \geq (C/4) \tan \alpha + 0.1C$$

This assures that vortex 12 does not move out of the reach of plate 15 in any operating position of lifting surface 10 so that vortex 12 can induce a stall angle of attack on plate 15 and dissipate a major portion of its strength.

Figure 6:
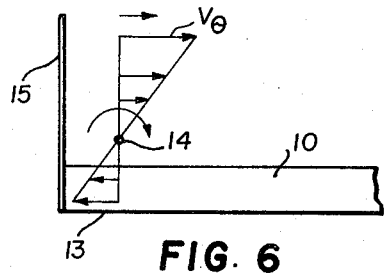
FIG. 6 is a rear elevation of the dissipator of FIG. 4 schematically showing a vortex rotational velocity diagram.

FIG. 6 shown the velocity component diagram from the center 14 of the vortex as related to plate 15 and viewed from behind lifting surface 10, and plate 15 extends above the maximum rotational velocity component $V_\theta$ directed inward along the span of lifting surface 10.

Figure 5:
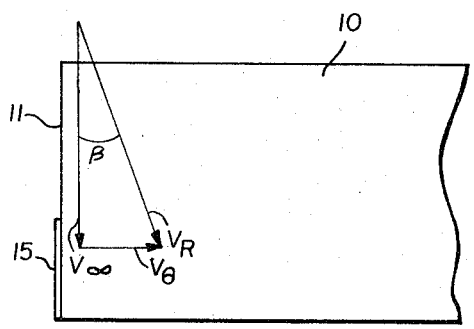
FIG. 5 is a plan view of the dissipator of FIG. 4 schematically showing the velocity vectors involved in dissipating the vortex.

The induced stall angle of attack on plate 15 is best shown in FIG. 5 where the $V_\infty$ vector is the free flow velocity coming from an infinite distance ahead of lifting surface 10, and $V_\theta$ is the inward rotational velocity component of the vortex formed at the leading edge of tip 11. The resultant velocity vector $V_R$ has an angle $\beta$ from the free flow direction $V_\infty$, and since plate 15 is aligned with the free stream flow and parallel with $V_\infty$ the resultant vector $V_R$ has the same angle relative to plate 15. Also angle $\beta$ is sufficiently large to be a stall angle of attack on plate 15 whenever the vortex has sufficient strength and velocity to be troublesome. Angle $\beta$ increases with increased strength and velocity of the vortex to increase the stall angle attack on plate 15 and make the turbulence downstream from plate 15 more forceful as the vortex grows in strength. Hence, the induced dissipation turbulence from plate 15 is proportional to vortex strength and automatically adequate to dissipate vortexes varying in strength.

Figure 7:
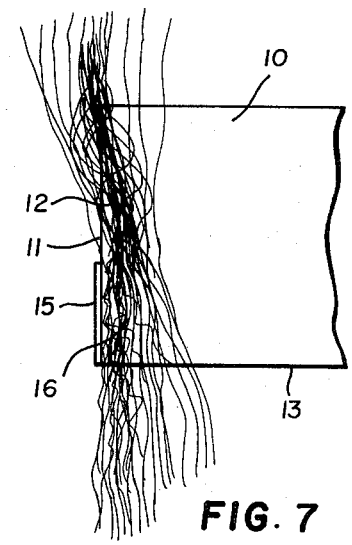
FIG. 7 is a plan view of the dissipator of FIG. 4 schematically showing dissipation of the tip vortex.

FIG. 7 schematically shows the formation of vortex 12 along the forward half of tip 11, and the resultant turbulent flow induced by the stall angle of attack on plate 15. The turbulence generated inward and downstream from plate 15 in region 16 interacts with vortex 12 to dissipate a major portion of its swirling strength.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the application of the invention to various lifting surfaces for both airfoils and hydrofoils and will know how to fit the inventive dissipator into an optimum relationship with the lifting surface tip to which it is applied.

I claim:

1. A dissipator for the vortex formed by a three-dimensional lifting surface, said dissipator comprising:
   a. a fixed plate secured to the tip of said lifting surface;
   b. said plate being aligned with the free stream flow over said lifting surface;
   c. said plate extending forward from the trailing edge of said tip;
   d. the length of said plate at said tip in said free stream direction being about 0.3 to 0.6 times the chord of said tip in said free stream direction;
   e. said plate extending outward from the suction side of said lifting surface far enough to reach the maximum rotational velocity region of the vortex formed along said tip in any practical angle of attack of said lifting surface; and
   f. said plate being arranged relative to the geometry of said lifting surface so that the resultant of the velocity of said free stream flow and the rotational velocity of said vortex produces a stall angle of attack relative to said plate to produce turbulence downstream of said plate sufficient to dissipate a substantial portion of the strength of said vortex.

2. The dissipator of claim 1 wherein the height of said plate at the trailing edge of said plate is at least $$(C/4) \tan \alpha + 0.1C$$

where C equals said chord and $\alpha$ equals the maximum practical aerodynamic angle of attack of said lifting surface.

3. The dissipator of claim 1 wherein said lifting surface is a flap on an aircraft wing.

4. The dissipator of claim 1 wherein said lifting surface is a helicopter blade.

5. The dissipator of claim 1 wherein said lifting surface is a hydrofoil for a water surface craft.

6. The dissipator of claim 1 wherein said lifting surface is a hydrofoil for a submarine.

7. The dissipator of claim 1 wherein said lifting surface is an aircraft wing.

8. A method of dissipating the vortex formed at the tip of a three-dimensioned lifting surface, said method comprising:
   a. leaving the leading edge region of said tip clear to allow said vortex to form along said leading edge region of said tip;
   b. erecting a fixed plate along the trailing edge region of said tip adjacent said vortex and aligned with the free stream flow over said lifting surface;
   c. arranging said plate relative to the geometry of said lifting surface so that the resultant of the velocity of said free stream flow and the rotational velocity of said vortex produces a stall angle of attack relative to said plate; and
   d. letting the turbulence downstream of said plate resulting from said stall angle of attack combine with said vortex to dissipate a substantial portion of the strength of said vortex.

9. The method of claim 8 including confining said plate approximately to the rearward half of said tip.

10. The method of claim 9 including making said plate extend outward from said lifting surface far enough to reach the maximum rotational velocity region of said vortex.

* * * * *